United States Patent
Kuwabara et al.

(10) Patent No.: US 8,800,207 B2
(45) Date of Patent: Aug. 12, 2014

(54) GLASS-RUN RETAINER FOR AUTOMOBILE DOOR AND DOOR STRUCTURE OF AUTOMOBILE

(71) Applicants: Nishikawa Rubber Co., Ltd., Hiroshima (JP); Tesla Motors, Inc., Palo Alto, CA (US)

(72) Inventors: Hirokazu Kuwabara, Hiroshima (JP); Matthew Richard Partsch, Livonia, MI (US)

(73) Assignees: Nishikawa Rubber Co., Ltd., Hiroshima (JP); Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/720,608

(22) Filed: Dec. 19, 2012

(65) Prior Publication Data

US 2013/0160374 A1 Jun. 27, 2013

(30) Foreign Application Priority Data

Dec. 22, 2011 (JP) ................................. 2011-282133

(51) Int. Cl.
*E06B 7/16* (2006.01)

(52) U.S. Cl.
USPC .......................................................... 49/441

(58) Field of Classification Search
USPC .......... 49/440, 441, 498.1, 493.1, 489.1, 502; 296/146.2, 146.3
See application file for complete search history.

(56) References Cited

U.S. PATENT DOCUMENTS

| | | | |
|---|---|---|---|
| 6,792,718 B2 * | 9/2004 | Nozaki | 49/441 |
| 7,762,614 B2 * | 7/2010 | Kubo et al. | 296/146.2 |
| 8,327,584 B2 * | 12/2012 | Goto | 49/441 |
| 2001/0034976 A1 * | 11/2001 | Maass | 49/441 |
| 2002/0046499 A1 * | 4/2002 | Nozaki et al. | 49/441 |
| 2007/0089371 A1 * | 4/2007 | Krause | 49/441 |
| 2009/0001755 A1 * | 1/2009 | Fuetterer | 296/146.16 |

FOREIGN PATENT DOCUMENTS

| | | |
|---|---|---|
| JP | 01-111017 U | 7/1989 |
| JP | 2008-285067 A | 11/2008 |
| WO | WO 2010/001016 A1 | 1/2010 |

* cited by examiner

*Primary Examiner* — Katherine Mitchell
*Assistant Examiner* — Scott Denion
(74) *Attorney, Agent, or Firm* — Alston & Bird LLP

(57) ABSTRACT

An integrated retainer in which an inner part of a retainer upper part extending above a door belt line and an inner part of a retainer lower part extending below the door belt are continuous without a joint line is employed for an automobile door. The retainer lower part has an approximate U shape including an inner part and an outer part as glass-run holding parts. The retainer upper part includes only an inner part as a glass-run holding part.

4 Claims, 6 Drawing Sheets

GLASS-RUN RETAINER FOR AUTOMOBILE DOOR AND DOOR STRUCTURE OF AUTOMOBILE

CROSS-REFERENCE TO RELATED APPLICATION

This application claims priority to Japanese Patent Application No. 2011-282133 filed on Dec. 22, 2011, the disclosure of which including the specification, the drawings, and the claims is hereby incorporated by reference in its entirety.

BACKGROUND

The present disclosure relates to glass-run retainers for automobile doors and door structures of automobiles.

As illustrated in FIG. 1, an automobile door having a structure in which a side panel 2 is provided adjacent to an up-and-down sliding window pane (hereinafter referred to as a sliding window pane) 1 is generally known. In a front door illustrated in FIG. 1, a fixed glass panel is provided as the side panel 2 at a position adjacent to, and at the front of, the sliding window pane 1. Such a side panel 2 is used as a mirror base in some cases, and also called a corner bracket. Although not shown, in a rear door, a side panel is also provided at a position adjacent to, and at the rear of, a sliding window pane in some cases. The side panel is not necessarily made of glass, and can be made of a metal or a resin.

As shown in Japanese Patent Publication No. 2008-285067, for example, a glass run 4 and a retainer 5 illustrated in FIG. 2 are conventionally located above a belt line L of a door so as to hold a sliding window pane 1 while allowing the panel 1 to move up and down. The retainer 5 has an approximate H cross section. In a recess of the retainer 5 at one side, a side edge of the side panel 2 is fitted with a seal 6 interposed therebetween. In another recess of the retainer 5 at the opposite side, the glass run 4 having an approximate U cross section is held to slidably hold the sliding window pane 1. On the other hand, as illustrated in FIG. 3, below the belt line L of the door, a retainer 7 having an approximate U cross section is provided as a component different from the approximately H-shaped retainer 5 located above the belt line L. The retainer 7 has a recess in which a glass run 8 having an approximate U cross section is held. The retainer 7 is fixed to an inner panel of the door at vertically separated two positions with brackets 9 respectively interposed therebetween, for example.

Further, as described in Utility Model Publication No. H01-111017, it is also known that a glass run is provided not to project toward the outdoors but to be located only indoors so as to achieve a flush outside surface of the door, and thereby, a gap between a sliding window pane and a corner bracket is filled from the indoors. In Utility Model Publication No. H01-111017, the glass run (a seal member) is held by a core material fixed at the corner bracket side. Likewise, International Patent Publication No. 2010/001016 shows a technique in which a lip-equipped metal retainer is fixed to a fixed glass panel of a door and is located indoors and two lips thereof are in contact with the indoor surface and the end surface of a sliding window pane so as to achieve a flush outside surface of the door.

The door structures illustrated in FIGS. 1 to 3 have a possibility that a misalignment occurs between the upper and lower retainers 5 and 7 when the upper retainer 5 and the lower retainer 7 are attached to the side panel 2 and the door inner panel, respectively.

In particular, in providing a flush outside surface of the door in the manner described in Utility Model Publication No. H01-111017 or International Patent Publication No. 2010/001016, positioning of the retainers is difficult because the upper glass run and the glass run have different shapes, and the upper and lower retainers 5 and 7 have different cross-sectional shapes accordingly. In addition, when a misalignment occurs in attaching the side panel to a window part of the door, this misalignment leads to a misalignment of the upper retainer, thereby increasing the misalignment between the upper and lower retainers 5 and 7.

In a case where upper and lower glass runs are provided as separate components, when a misalignment occurs between the upper and lower retainers 5 and 7 as described above, a misalignment also occurs between the upper and lower glass runs to be attached to these retainers 5 and 7. This misalignment hinders smooth movement of the sliding window pane 1. If the upper and lower glass runs are continuously formed to be integrated, it is necessary to insert the integrated glass runs into the retainer 7 in the door body (i.e., between the inner panel and the outer panel) from the top of the retainer 7 for attachment. In this case, only poor assembly is obtained.

SUMMARY

It is therefore an object of the present disclosure to solve the problem of a misalignment between retainers described above.

It is also an object of the present disclosure to provide smooth movement of a sliding window pane.

It is still another object of the present disclosure to improve assembly of a glass run.

The present disclosure employs an integrated retainer which is continuously formed from the top to the bottom across a door belt line.

Specifically, a glass-run retainer for an automobile door in an aspect of the present disclosure is applicable to an automobile door including a sliding window pane and a side panel located adjacent to the sliding window pane and fixed to a door window part. The glass-run retainer includes:

a retainer upper part extending upward from a position lower than a belt line of the door across the belt line; and a retainer lower part integrated with the retainer upper part and extending downward from a lower end of the retainer upper part, wherein the retainer upper part includes, as a glass-run holding part, only an inner part configured to hold, at an indoor side, a glass-run upper part with which a side edge of the sliding window pane toward the side panel is in slidable contact, and the retainer lower part has an approximate U cross section including, as glass-run holding parts, an inner part configured to hold, at an indoor side, a glass-run lower part with which the side edge of the sliding window pane is in slidable contact and an outer part configured to hold, at an outdoor side, the glass-run lower part.

A door structure of an automobile in an aspect of the present disclosure includes a sliding window pane and a side panel located adjacent to the sliding window pane and fixed to a door window part, wherein a fixed part is provided in the retainer upper part of the glass-run retainer described above, and fixed to the side panel, the retainer lower part of the glass-run retainer is fixed to a door panel, above a position lower than a door belt line in the door, a glass-run upper part with which a side edge of the sliding window pane toward the side panel is in slidable contact is held at an indoor side by the inner part of the retainer upper part, below the position lower than the door belt line, a glass-run lower part having an approximate U cross section with which the side edge of the sliding window pane is in slidable contact is held at an indoor side and/or an outdoor side by the inner part and/or the outer part of the retainer lower part, and the glass-run upper part seals a gap between the sliding window pane and the side panel only from the indoor side.

Preferably, the glass-run upper part and the glass-run lower part are integrated together.

The glass-run retainer of the present disclosure is an integrated retainer in which the inner part of the retainer upper part and the inner part of the retainer lower part are continuous. Accordingly, the problems of a misalignment between the retainer upper part and the retainer lower part and a misalignment between the glass-run upper part and the glass-run lower part can be eliminated. Thus, the glass-run retainer can be advantageous for smooth movement of the sliding window pane, and can lead to reduction in the number of components.

The retainer upper part has only the inner part as a glass-run holding part, and the glass-run holding part itself has no projection toward the outside of the door window part. Accordingly, the structure of the present disclosure can be advantageous for obtaining a flush outside surface of the door. In particular, if the glass-run upper part is configured to seal a gap between the sliding window pane and the side panel only from the indoor side, a more excellent flush outside surface of the door can be achieved.

The retainer lower part has the approximate U cross section including the inner part and the outer part as glass-run holding parts, thus ensuring holding of the glass-run lower part. The glass-run lower part having the approximate U cross section can achieve smooth movement of the sliding window pane.

In addition, with the structure described above, the glass-run retainer in which the glass-run upper part and the glass-run lower part are attached to the retainer and the retainer upper part is fixed to the side panel can be attached the door body. Accordingly, assembly of the entire door can be easily performed.

The door structure for an automobile according to the present disclosure employs the integrated glass-run retainer described above. This structure can be advantageous for achieving reduction of the number of components, smooth movement of the sliding window pane, and a flush outside surface of the door, and can facilitate assembly of the entire door.

DETAILED DESCRIPTION

An embodiment of the present disclosure will be described hereinafter with reference to the drawings. The following embodiment is merely a preferred example in nature, and is not intended to limit the scope, applications, and use of the invention.

Figure 1:
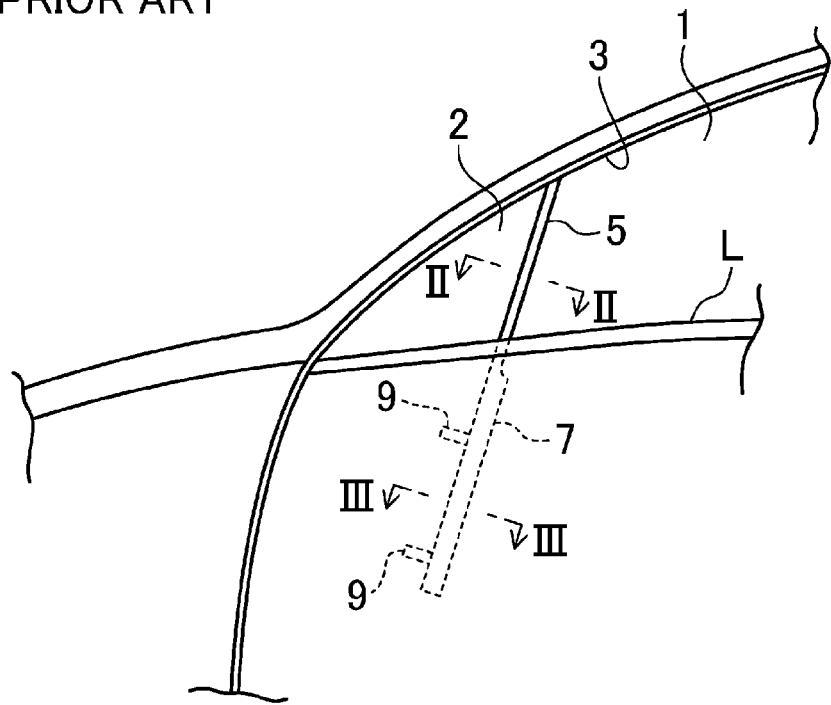
FIG. 1 is a side view illustrating a conventional door of an automobile.
Figure 2:
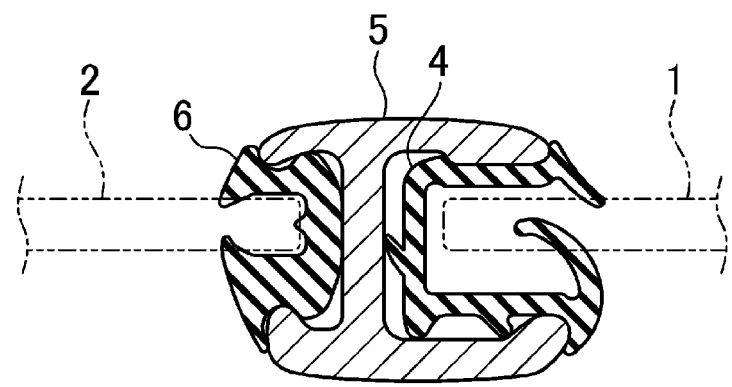
FIG. 2 is a cross-sectional view taken along line II-II in FIG. 1.
Figure 3:
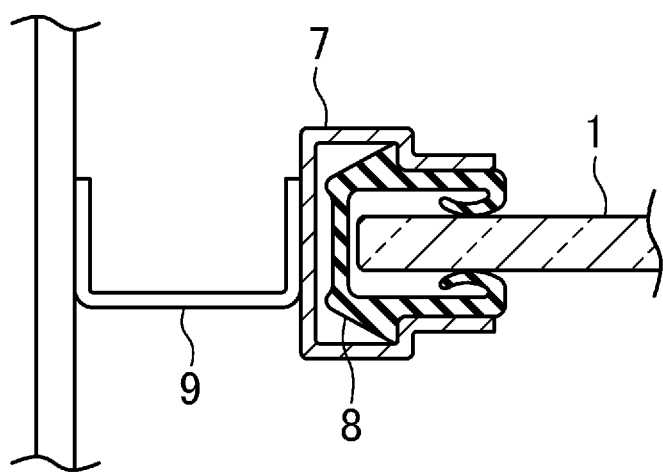
FIG. 3 is a cross-sectional view taken along line III-III in FIG. 1.
Figure 4:
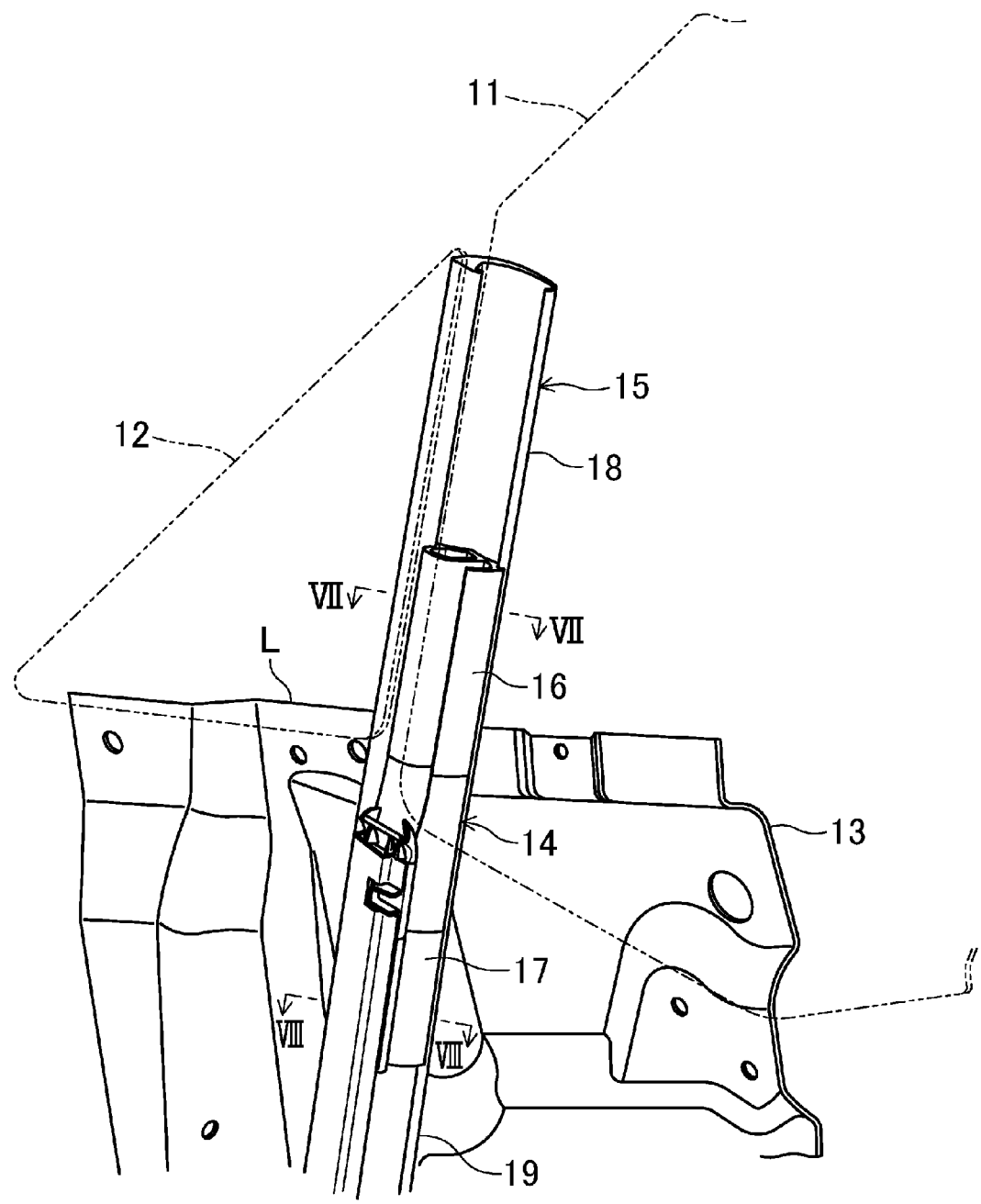
FIG. 4 is a perspective view illustrating a door structure of an automobile according to the present disclosure.

FIG. 4 illustrates a structure of a front door for an automobile according to an embodiment. In FIG. 4, reference character 11 denotes a sliding window pane, reference character 12 denotes a side panel located adjacent to the sliding window pane 11 and fixed to a door window part at the front of the sliding window pane 11, and reference character 13 denotes a door inner panel. To lift and lower the sliding window pane 11, a glass run 14 is provided at the front of the sliding window pane 11 (i.e., toward the side panel 12), and a retainer 15 for holding the glass run 14 is provided. FIG. 4 is a view of a front part of the door when viewed from the outdoors with a door outer panel omitted.

Figure 5:
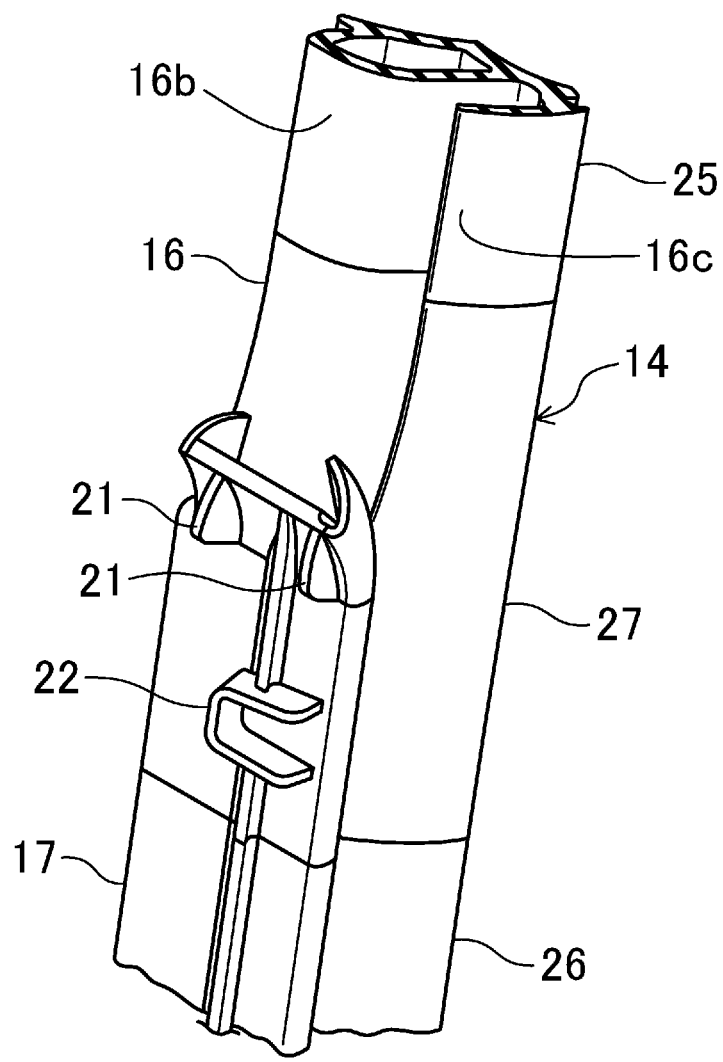
FIG. 5 is a perspective view illustrating part of a retainer according to the present disclosure.
Figure 6:
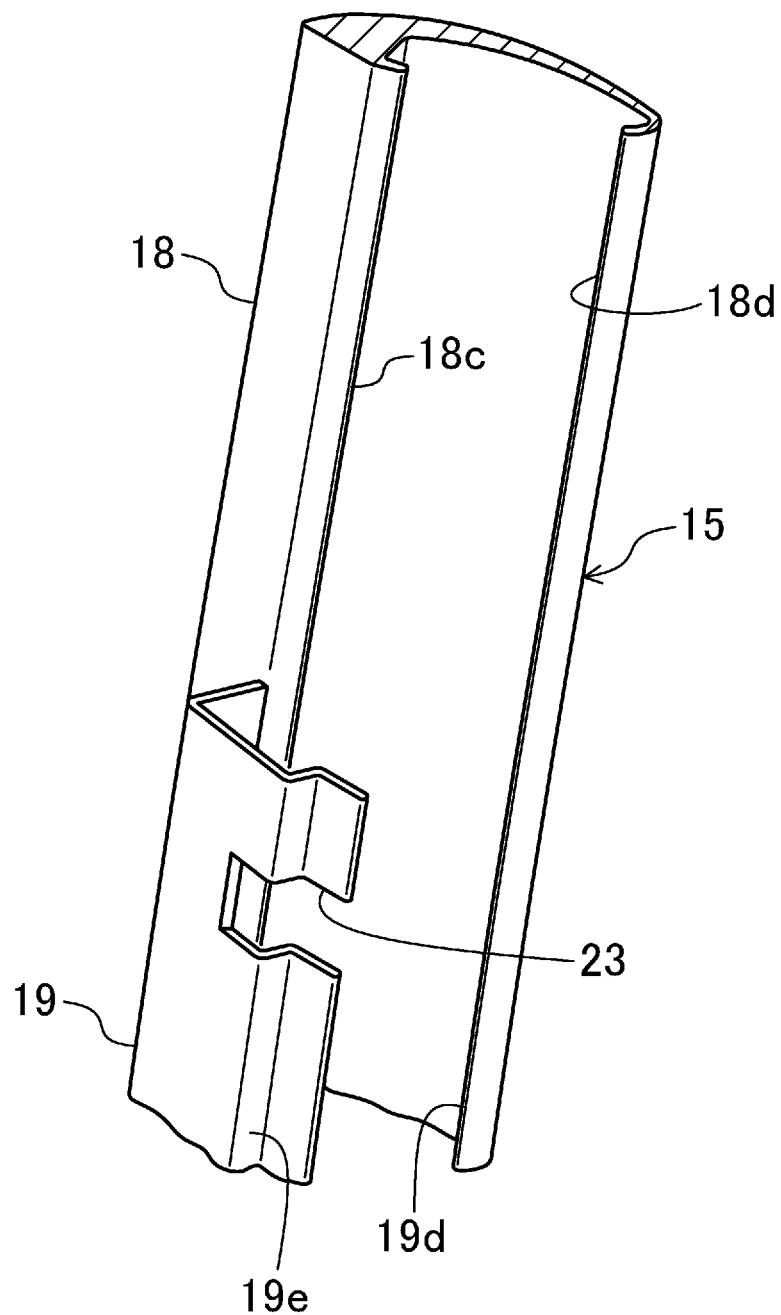
FIG. 6 is a perspective view illustrating part of a glass run according to the present disclosure.

As illustrated in FIG. 5, the glass run 14 is an integrated unit made of a glass-run upper part 16 and a glass-run lower part 17. As illustrated in FIG. 6, the retainer 15 is also an integrated unit made of a retainer upper part 18 and a retainer lower part 19.

As illustrated in FIG. 4, the glass-run upper part 16 extends upward from a position lower than a door belt line (i.e., the upper edge of a door inner panel 13) L across the belt line L. In FIGS. 4 and 5, although the glass-run upper part 16 is shown to be cut away at a halfway position, the upper end of the glass-run upper part 16 reaches near the upper end of the side panel 12. The glass-run lower part 17 is continuous to the glass-run upper part 16, and extends downward from the lower end of the glass-run upper part 16. The lower end of the glass-run lower part 17 extends to a portion near the lower end of the sliding window pane 11 when the sliding window pane 11 is moved to the bottom.

In the retainer 15, the retainer upper part 18 extends upward across the belt line L from a position lower than the belt line L in association with the glass run 14, and the upper end of the retainer upper part 18 reaches near the upper end of the side panel 12. The retainer lower part 19 is continuous to the lower end of the retainer upper part 18, and extends downward. The lower end of the retainer lower part 19 reaches near the lower end of the glass-run lower part 17.

Shape of Glass Run 14

Figure 7:
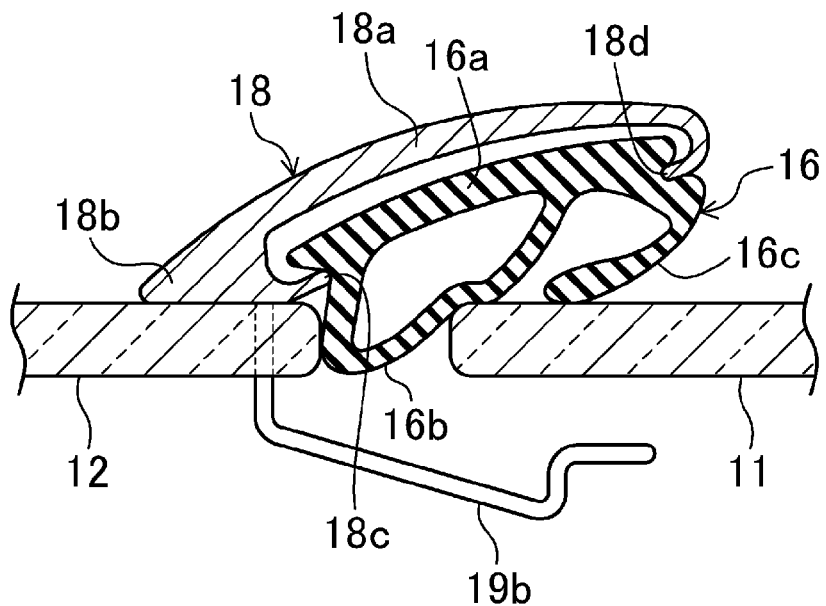
FIG. 7 is a cross-sectional view taken along line VII-VII in FIG. 4.

As illustrated in FIG. 7 (a cross-sectional view taken along line VII-VII in FIG. 4), the glass-run upper part 16 is provided to seal a gap between the sliding window pane 11 and the side panel 12 only from the indoor side. To obtain this structure, the glass-run upper part 16 includes a base part 16a located indoors and extending substantially in the front-to-rear direction of the automobile, a seal part 16b located outside the base part 16a, and a lip part 16c folded to the outdoor side from the side edge of the rear portion (i.e., a portion toward the sliding window pane 11) of the base part 16a. The seal part 16b has a hollow shape in cross section, and projects from the base part 16a toward the gap between the sliding window pane 11 and the side panel 12. The sliding window pane 11 is lifted or lowered with its side edge toward the side panel 12 being in slidable contact with the seal part 16b, and its indoor surface near the side edge thereof being in slidable contact with the lip part 16c.

Figure 8:
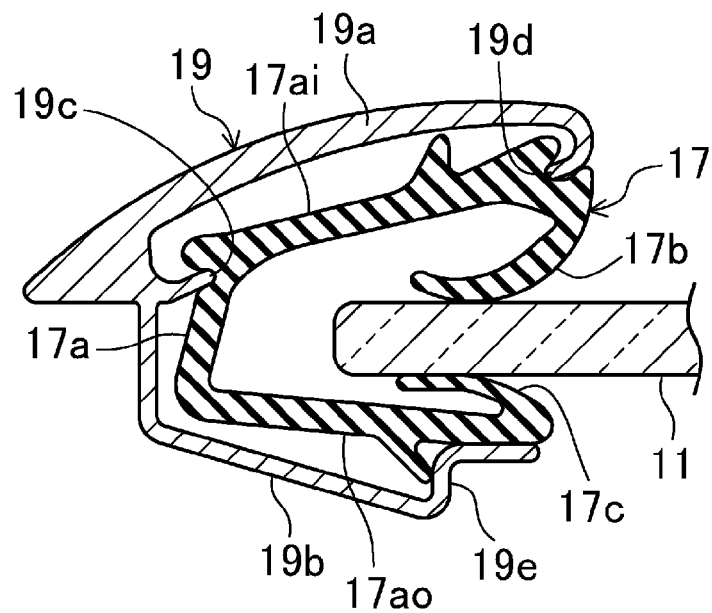
FIG. 8 is a cross-sectional view taken along line VIII-VIII in FIG. 4.

As illustrated in FIG. 8 (a cross-sectional view taken along line VIII-VIII in FIG. 4 and showing a state in which the sliding window pane 11 is lowered), the glass-run lower part 17 sandwiches an end of the sliding window pane 11 toward the side panel 12 at the indoor and outdoor sides below the belt line L, and guides the movement of the sliding window pane 11. To obtain this structure, the glass-run lower part 17 includes a base part 17a having an approximate U cross section which is open rearward (i.e., toward the sliding window pane 11), and lip parts 17b and 17c folded inward from the edges (at the indoor and outdoor sides, respectively) of the U shape of the base part 17a. The sliding window pane 11 is lifted or lowered with its indoor and outdoor surfaces toward the side edge of the side panel 12 being in slidable contact with the lip parts 17b and 17c.

Shape of Retainer 15

As illustrated in FIG. 7, the retainer upper part 18 includes, as a glass-run holding part, only an inner part 18a for holding the glass-run upper part 16. The retainer upper part 18 includes the inner part 18a and a fixed part 18b to be fixed to the side panel 12.

The inner part 18a extends substantially in the front-to-rear direction of the automobile along the base part 16a of the glass-run upper part 16, and includes engagement parts 18c and 18d folded toward the outdoors to hold the glass-run upper part 16 respectively at both side edges of the retainer upper part 18. Grooves are formed in both side edges of the base part 16a, and engage the engagement parts 18c and 18d, respectively, such that the glass-run upper part 16 is held by the retainer upper part 18. The fixed part 18b projects from the inner part 18a toward the side panel 12, and is fixed to the indoor surface of the side panel 12.

As illustrated in FIG. 8, the retainer lower part 19 includes, as glass-run holding parts, an inner part 19a holding the glass-run lower part 17 at the indoor side and an outer part 19b holding the glass-run lower part 17 at the outdoor side. The retainer lower part 19 has an approximate U cross section which is open rearward (i.e., toward the sliding window pane 11).

The inner part 19a has a cross-sectional shape identical to that of the inner part 18a of the retainer upper part 18. Specifically, the inner part 19a extends substantially in the car width direction along the indoor side of the base part 17a of the glass-run lower part 17, and includes, at its both side edges, engagement parts 19c and 19d folded toward the outdoors to hold the glass-run lower part 17. Grooves are formed in both side edges of an indoor side wall 17ai of the base part 17a of the glass-run lower part 17, and engage the engagement parts 19c and 19d, respectively.

The outer part 19b extends substantially in the front-to-rear direction of the automobile along an outdoor side wall 17ao of the base part 17a of the glass-run lower part 17, and has, at its intermediate portion, an engagement part 19e bending to form an approximate L shape. The engagement part 19e engages a projection which projects to the outdoors from the outdoor side wall 17ao of the base part 17a of the glass-run lower part 17. In addition, the tip of the outer part 19b facing the outdoor side wall 17ao is elastically in contact with the tip of the base part 17a of the glass-run lower part 17 at the outdoor side.

The glass-run lower part 17 is held in the retainer lower part 19 by means of engagement between the indoor grooves and the engagement parts 19c and 19d of the retainer lower part 19, engagement between the outdoor projection and the engagement part 19e of the retainer lower part 19, and elastic contact between the outdoor side wall 17ao and the retainer lower part 19.

That is, the retainer 15 is an integrated retainer in which the inner part 18a of the retainer upper part 18 and the inner part 19a of the retainer lower part 19 are continuous without a joint line. In the overall shape of the retainer 15, the retainer upper part 18 does not have a portion corresponding to the outer part 19b of the retainer lower part 19.

Positioning of Glass Run 14 and Retainer 15

As illustrated in FIG. 5, the glass run 14 includes two upper projections 21 and a lower projection 22 at positions lower than the belt line L. The two upper projections 21 are spaced apart from each other in the front-to-rear direction of the automobile, and the lower surfaces of the upper projections 21 serve as stopper surfaces. The lower projection 22 has an approximate U cross section which is open rearward, and has an upper wall, a lower wall, and a vertical wall connecting the upper and lower walls. The vertical wall may be omitted.

On the other hand, in the retainer 15, the upper end surface of the outer part 19b of the retainer lower part 19 serves as a receiving surface which receives the upper projections 21 of the glass run 14. The outer part 19b has an engagement indent 23 having an approximate U cross section which is open rearward. The engagement indent 23 engages the lower projection 22 of the glass run 14.

The engagement between the upper projections 21 and the receiving surface and the engagement between the lower projection 22 and the engagement indent 23 described above can provide relative positioning of the glass run 14 and the retainer 15 or prevent detachment of the glass run 14 from the retainer 15.

Formation of Glass Run 14

As illustrated in FIG. 5, the glass run 14 is configured by connecting upper and lower members 25 and 26, each formed by extrusion molding, with an intermediate joint member 27 such that the upper member 25, the lower member 26, and the intermediate joint member 27 are arranged in series. The upper end of the intermediate joint member 27 has a cross-sectional shape identical to that of the upper member 25, and the lower end of the intermediate joint member 27 has a cross-sectional shape identical to that of the lower member 26. That is, the cross-sectional shape of the intermediate joint member 27 changes at its intermediate portion from the cross-sectional shape of the upper member 25 to the cross-sectional shape of the lower member 26. Accordingly, the upper member 25 and the upper portion of the intermediate joint member 27 form the glass-run upper part 16, and the lower member 26 and the lower part of the intermediate joint member 27 form the glass-run lower part 17.

The glass run 14 can be obtained by insert molding. Specifically, the upper and lower members 25 and 26 which have been extrusion molded beforehand are placed in a mold for an intermediate joint member 27, and an intermediate joint member 27 is molded using the mold described above. In this manner, a glass run 14 in which the upper member 25, the lower member 26, and the intermediate joint member 27 are connected in series can be obtained. The glass run 14 may be made of a rubber, a resin (including thermoplastic elastomer: TPE), or a complex of a rubber and a resin (e.g., the upper member 25 and the lower member 26 are made of rubber and the intermediate joint member 27 is made of resin).

Formation of Retainer 15

As described above, the retainer 15 has a shape in which the inner part 18a of the retainer upper part 18 and the inner part 19a of the retainer lower part 19 are continuous without a joint line, and the retainer upper part 18 does not have an outer part (see FIG. 6). Accordingly, in a case where the retainer 15 is made of a metal such as an aluminium alloy, a retainer material having a cross-sectional shape of the retainer lower part 19 is formed by extrusion or roll forming, and then an upper outer portion of the retainer material is cut away, thereby obtaining a retainer 15. The retainer material may be obtained by extrusion molding of a resin material. Alternatively, the retainer 15 may be molded by injecting a resin material into a mold. In this case, the cutting process described above is unnecessary.

Attachment of Glass Run 14 and Retainer 15 to Door Body

The glass run 14 is attached to the retainer 15, and the retainer upper part 18 is fixed to the side panel 12. This fixing may be obtained by using an adhesive or fasteners such as screws. Alternatively, the fixed part of the retainer upper part 18 may be formed to have an approximate U cross section which is open forward and sandwiches the side panel 12 therebetween. Then, the assembly of the side panel 12, the glass run 14, and the retainer 15 is attached to the door body. Specifically, the side panel 12 of the assembly is fixed to the upper edge of the door inner panel 13, and the lower end of the retainer 15 is fixed to the door inner panel 13 with brackets interposed therebetween.

Advantages of Embodiment

As described above, according to the foregoing embodiment, the retainer upper part 18 extending above the belt line L and the retainer lower part 19 extending below the belt line L are continuous and integrated together. Accordingly, the number of components can be reduced, and the problems of a misalignment between the retainer upper part 18 and the retainer lower part 19 and a misalignment between the glass-run upper part 16 and the glass-run lower part 17 can be eliminated. As a result, the structure of the embodiment is advantageous for smooth movement of the sliding window pane 11.

The glass-run upper part 16 is configured such that a gap between the sliding window pane 11 and the side panel 12 is filled only from the indoor side. In addition, the retainer upper part 18 has no projection toward the outdoors, resulting in a flush outside surface of the door.

Furthermore, the assembly in which the glass run 14 is attached to the retainer 15 and the retainer upper part 18 is fixed to the side panel 12 can be attached to the door inner panel 13. Accordingly, this structure can ease assembly of the entire door, especially attachment of the glass run 14 to the retainer 15. Specifically, unlike a conventional structure in which a retainer upper part and a retainer lower part are formed as separate components, the glass run 14 and the retainer 15 are previously assembled in this embodiment, and this assembly is installed in the door body. Accordingly, a conventional laborious process in which a glass run is inserted into a retainer in a door body from the top of the retainer and then these components are assembled can be eliminated.

The glass-run upper part 16 and the glass-run lower part 17 may be separate components, and may not include the intermediate joint member 27.

The foregoing embodiment relates to a structure of a front door for an automobile, but is applicable to a rear door. In a case where a side panel of a rear door is adjacent to a sliding window pane and located at the rear of the sliding window pane, each of the glass-run lower part 17 and the retainer lower part 19 has an approximate U cross section which is open forward.

What is claimed is:

1. A glass-run retainer for an automobile door including a sliding window pane and a side panel located adjacent to the sliding window pane and fixed to a door window part, the glass-run retainer comprising:
   a retainer upper part extending upward from a position lower than a belt line of the door across the belt line; and
   a retainer lower part having a longitudinal length, the retainer lower part being integrated with the retainer upper part and extending downward from a lower end of the retainer upper part, wherein:
   the retainer lower part has an approximate U-shaped cross section perpendicular to a longitudinal axis of the retainer;
   the retainer upper part has a cross section perpendicular to the longitudinal axis of the retainer, the cross section having a shape substantially different than the approximate U-shaped cross section of the retainer lower part;
   the retainer lower part includes, as glass-run holding parts: (1) an inner part configured to hold, at an indoor side, a glass-run lower part with which a side edge of the sliding window pane is in slidable contact; and (2) an outer part having a longitudinal length that is as long as the longitudinal length of the retainer lower part, the outer part being configured to hold, at an outdoor side, the glass-run lower part;
   the retainer upper part includes, as a glass-run holding part, only the inner part configured to hold, at the indoor side, a glass-run upper part with which a side edge of the sliding window pane toward the side panel is in slidable contact; and
   the retainer upper part excludes the outer part.

2. A door structure of an automobile including a sliding window pane and a side panel located adjacent to the sliding window pane and fixed to a door window part, comprising:
   a glass-run retainer comprising:
      a retainer upper part extending upward from a position lower than a belt line of the door across the belt line; and
      a retainer lower part having a longitudinal length, the retainer lower part being integrated with the retainer upper part and extending downward from a lower end of the retainer upper part, wherein
      the retainer lower part has an approximate U-shaped cross section perpendicular to a longitudinal axis of the retainer, said U-shaped cross section;
      the retainer upper part has a cross section perpendicular to the longitudinal axis of the retainer, the cross section having a shape substantially different than the approximate U-shaped cross section of the retainer lower part;
      the retainer lower part includes, as glass-run holding parts: (1) an inner part configured to hold, at an indoor side, a glass-run lower part with which a side edge of the sliding window pane is in slidable contact; and (2) an outer part having a longitudinal length that is as long as the longitudinal length of the retainer lower part, the outer part being configured to hold, at an outdoor side, the glass-run lower part;

the retainer upper part includes, as a glass-run holding part, only the inner part configured to hold, at the indoor side, a glass-run upper part with which a side edge of the sliding window pane toward the side panel is in slidable contact; and the retainer upper part excludes the outer part; and a fixed part provided in the retainer upper part of the glass-run retainer is fixed to the side panel;

the retainer lower part of the glass-run retainer is fixed to a door panel of the door structure; and the glass-run upper part seals a gap between the sliding window pane and the side panel only from the indoor side.

3. The door structure of claim 2, wherein the glass-run upper part and the glass-run lower part are integrated together.

4. A glass-run retainer for an automobile door comprising:
a retainer upper part consisting of:
  (i) a first inner part having a first engagement part configured to hold a glass run-upper part;
  (ii) a fixed part configured to be adjacent to a panel; and
  (iii) a distal portion;
a retainer lower part having a longitudinal length and comprising:
  (i) a second inner part having a second engagement part configured to hold a glass run-lower part;
  (ii) an outer part having a longitudinal length that is as long as the longitudinal length of the retainer lower part, the outer part having a third engagement part configured to hold the glass run-lower part; and
  (iii) a proximal portion that is connected to the distal portion of the retainer upper part,
wherein:
  (i) the second inner part and the outer part of the retainer lower part have a U-shaped cross section, that is perpendicular to a longitudinal axis of the retainer; and
  (ii) the retainer upper part has a cross section shape that is perpendicular to a longitudinal axis of the retainer, non-U-shaped, different than the U-shaped cross section of the retainer lower part, and excludes the outer part of the retainer lower part.

* * * * *